(12) United States Patent
Killian et al.

(10) Patent No.: US 11,184,429 B2
(45) Date of Patent: Nov. 23, 2021

(54) SHARING NETWORK CONNECTIONS TO CONTENT SOURCES

(71) Applicant: Amazon Technologies, Inc., Seattle, WA (US)

(72) Inventors: David A. Killian, Seattle, WA (US); Jonathan A. Jenkins, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 130 days.

(21) Appl. No.: 16/160,312

(22) Filed: Oct. 15, 2018

(65) Prior Publication Data
US 2019/0182315 A1 Jun. 13, 2019

Related U.S. Application Data

(63) Continuation of application No. 13/600,002, filed on Aug. 30, 2012, now Pat. No. 10,104,165.

(51) Int. Cl.
*H04L 29/08* (2006.01)
*H04L 12/725* (2013.01)

(52) U.S. Cl.
CPC .......... *H04L 67/1002* (2013.01); *H04L 67/26* (2013.01); *H04L 67/306* (2013.01); *H04L 67/327* (2013.01); *H04L 45/30* (2013.01); *H04L 67/02* (2013.01); *H04L 67/1008* (2013.01); *H04L 67/1014* (2013.01); *H04L 67/1029* (2013.01); *H04L 67/303* (2013.01)

(58) Field of Classification Search
CPC . H04L 45/30; H04L 67/1008; H04L 67/1029; H04L 67/306; H04L 69/329; H04L 67/02; H04L 67/1002; H04L 67/327; H04L 67/1014; H04L 67/26
See application file for complete search history.

(56) References Cited

U.S. PATENT DOCUMENTS 6,338,089 B1   1/2002  Quinlan
8,170,971 B1 * 5/2012  Wilson ................... G06N 5/022
                                                  706/46

(Continued)

*Primary Examiner* — Philip J Chea
*Assistant Examiner* — Mohammed Ahmed
(74) *Attorney, Agent, or Firm* — Knobbe, Martens, Olson & Bear, LLP

(57) ABSTRACT

Features are disclosed for sharing network connections among client devices. A client device may connect to an intermediary system and request content from content provider. The intermediary system may, in addition to opening a connection with the content provider and receiving the content on behalf of the client, create a request profile for the client device regarding likely future content requests. The request profile may be used to assign the client device to network comparing components that have available open network connections to one or more content providers from which the client device is likely to request content. In some cases, a gateway network computing component may route content requests to other network computing components which have available open network connections to content providers hosting requested content. Additionally, the number of active network computing components may be adjusted to increase connection sharing and reuse opportunities.

20 Claims, 6 Drawing Sheets

(56) References Cited

U.S. PATENT DOCUMENTS

| | | | | |
|---|---|---|---|---|
| 8,918,464 B1* | 12/2014 | Mei | ......................... | H04M 3/56 |
| | | | | 709/204 |
| 8,949,658 B1* | 2/2015 | Scanlan | .............. | G06F 11/3419 |
| | | | | 714/4.2 |
| 2005/0108380 A1 | 5/2005 | Odhner et al. | | |
| 2005/0278453 A1 | 12/2005 | Cherkasova | | |
| 2007/0033293 A1 | 2/2007 | Rumelhart | | |
| 2007/0123253 A1 | 5/2007 | Simongini et al. | | |
| 2008/0294793 A1* | 11/2008 | Han | .................... | H04L 12/6418 |
| | | | | 709/235 |
| 2009/0168701 A1 | 7/2009 | White et al. | | |
| 2009/0222405 A1 | 9/2009 | Cara et al. | | |
| 2009/0259752 A1 | 10/2009 | McNutt et al. | | |
| 2010/0057923 A1* | 3/2010 | Petter | .................. | H04L 67/1002 |
| | | | | 709/229 |
| 2010/0169424 A1 | 7/2010 | Gustafsson et al. | | |
| 2011/0252160 A1* | 10/2011 | Wu | ..................... | G06F 16/9577 |
| | | | | 709/246 |
| 2012/0110113 A1* | 5/2012 | Lee | ....................... | H04L 67/288 |
| | | | | 709/214 |
| 2013/0254375 A1* | 9/2013 | Agiwal | .............. | H04L 67/1002 |
| | | | | 709/224 |
| 2015/0324377 A1 | 11/2015 | Hayden | | |

* cited by examiner

SHARING NETWORK CONNECTIONS TO CONTENT SOURCES

CROSS-REFERENCE TO RELATED APPLICATION

The present application is a continuation of U.S. patent application Ser. No. 13/600,002, filed Aug. 30, 2012, the contents of which are incorporated by reference herein

BACKGROUND

Generally described, computing devices can request content from other computing devices via a communication network. For example, a user at a personal computing device can utilize a software browser application, typically referred to as a browser, to request a web page from a server computing device via the Internet. In such embodiments, the personal computing device can be referred to as a client computing device and the server computing device can be referred to as a content provider.

Illustratively, content requests may be transmitted in accordance with communication or networking protocols, such as the Hypertext Transfer Protocol ("HTTP"). More specifically, client computing devices can utilize HTTP-based connections between the client computing device and the content provider to transmit content requests. The establishment of network connections, such as HTTP connections, can involve a multi-step handshake procedure which may include several round-trip communications between the client computing device and a server associated with the content provider. Each round-trip communication between the client computing device and the server associated with the content provider consumes a number of resources required to complete the handshake, establish the connection, and complete content request. In some cases, each content request may result in the establishment of a new network connection between the client and the server.

In some instances, a communication network can include a number of network computing providers that may serve as intermediaries, or proxies, between client computing devices and content providers. In accordance with such embodiments, requests for content provided by content providers may be sent from client computing devices to the network computing provider instead of the content provider hosting the content. The network computing provider can fulfill the request for the client computing device, in some cases more efficiently or securely than direct connections from the client computing device to the content provider. For example, network computing providers can often be configured to provide multiple server computing devices in geographically distinct areas and to utilize caching techniques and other techniques to improve content delivery to the client computing devices. In addition, network computing providers may have access to additional or more reliable network resources, such as computing devices or network connections, than would otherwise be available to individual client computing devices or content providers.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
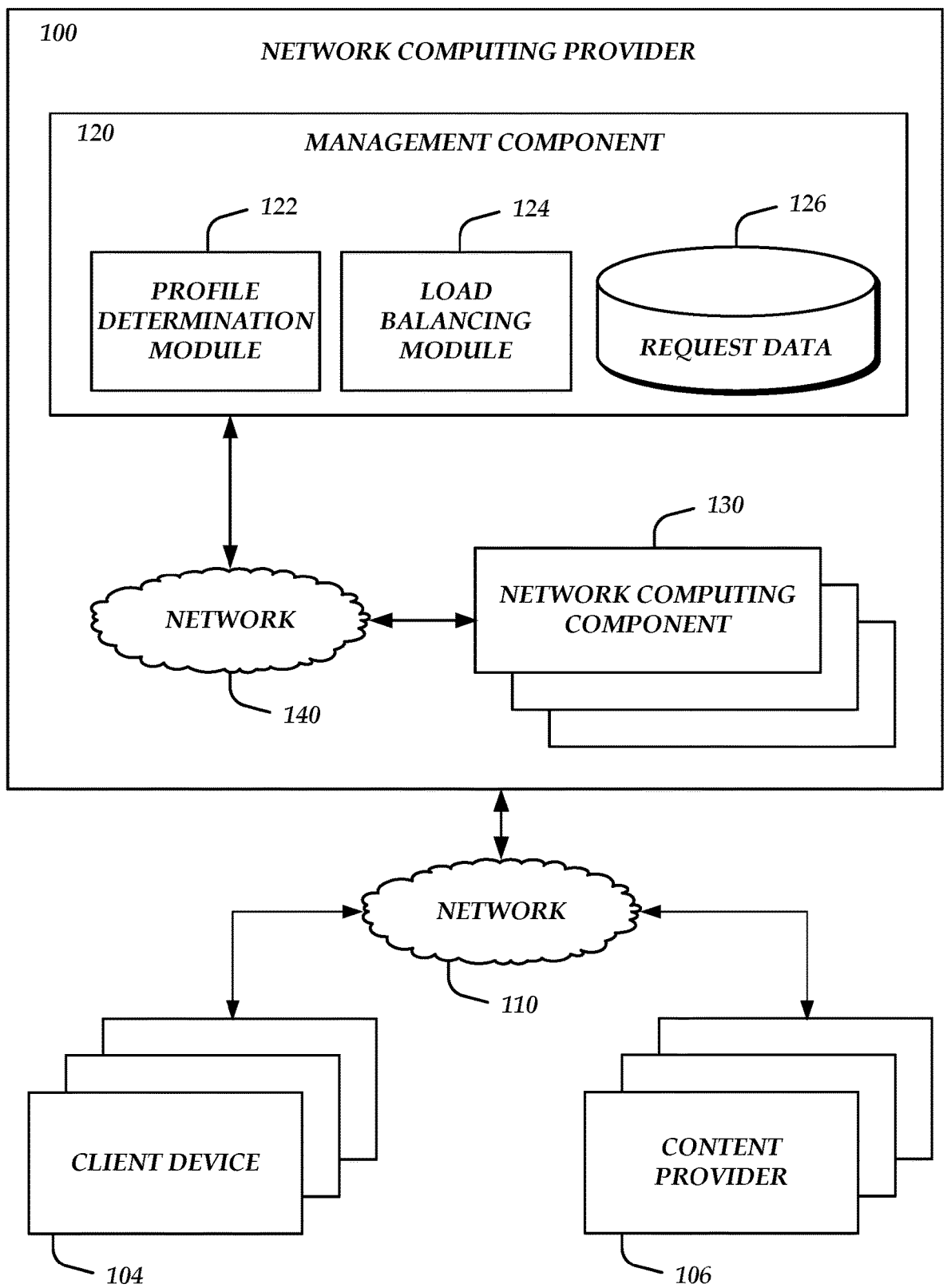
FIG. 1 is a block diagram of an illustrative network computing environment including multiple client computing devices, multiple content servers, and an intermediary network computing provider.

Generally described, the present disclosure relates to sharing network computing resources including, but not limited to, network connections, caches, data sets, and the like. Specifically, aspects of the disclosure relate to the pooling of open network connections between an intermediary system or network computing component and a content provider. The connection pool may be shared by any number of client computing devices associated with the network computing component. Establishment of each connection in the pool may occur in response to a content request received from a client computing device. In some embodiments, establishment of pooled network connections may include the proactive establishment of a network connection with a content provider in anticipation of a future request, from a client computing device, for content from the content provider. Selection of a network computing component with which to fulfill requests from a specific client computing device may be based on a request profile associated with the client computing device. The request profile may indicate one or more content providers from which the client computing device is likely to request content.

Caches, data sets, and the like may also be shared among any number of client computing devices similar to a pool of network connections. The addition of an object to a shared cache or the retrieval of a data set may occur in response to a request received from a client computing device, or may be performed proactively prior to receiving a request. Selection of a network computing component with which to assign a user may be based on a resource usage profile associated with the user. Multiple client computing devices and users may be assigned to a single network computing component, and may share a data set or a cache of data or objects in a manner similar to the sharing of network connections. In some embodiments, users may share both network connections and data, including cached data.

Additional aspects of the disclosure relate to utilizing a management component or gateway to manage a client computing device browsing session. The gateway can identify other network computing components with available open network connections to a content provider hosting content requested by the client computing device. Another network computing component may be employed to retrieve content from the content provider on behalf of the client computing device via the available open network connection. Accordingly, each content request from the client computing device may be fulfilled by a different network computing component, even though the client computing device remains in communication with a single or smaller number of network computing components.

Further aspects of the disclosure relate to the management of active network computing components to optimize the number of available open network connections and increase the number of opportunities for connection sharing. The number of active network computing components may be adjusted (e.g.: increased or decreased) based on the number of client computing devices currently requesting content, the content providers hosting the requested content, and the available open network connections to those content providers. For example, if several client computing devices are requesting content from the same content providers although the client computing devices are connected to different network computing components, the number of network computing components may be decreased so that the client computing devices may be connected to the same network computing component or group of network computing components. Such an adjustment may increase the opportunity for connection sharing.

Still further aspects of the disclosure relate to utilizing a management component to manage client computing sessions with respect to usage of shared computing resources. A management component may adjust the number of network computing components available in order to increase the number of opportunities for sharing of cached resources and data sets. For example, if several client computing devices are requesting the same data set or otherwise accessing the same network resources, the number of network computing components may be decreased so that the client computing devices may share the data and/or caches on a smaller number of network computing components.

Aspects of the embodiments described in the disclosure will focus, for the purpose of illustration, on the establishment of network connections between intermediary systems and content servers, and the pooling or sharing of those connections among multiple client computing devices. One skilled in the art will appreciate, however, that the techniques disclosed herein may be applied to any number of hardware or software processes or applications for sharing any type of network computing resource. Further, although various aspects of the disclosure will be described with regard to illustrative examples and embodiments, one skilled in the art will appreciate that the disclosed embodiments and examples should not be construed as limiting. Various aspects of the disclosure will now be described with regard to certain examples and embodiments, which are intended to illustrate but not limit the disclosure.

With reference to an illustrative example, a user may cause a client computing device to load a software browser application (henceforth referred to as a "browser") for accessing content provided by one or more content providers. Illustratively, the accessed content may include a collection of one or more network resources (e.g., a web page) and embedded resources such as images, video, audio, text, executable code, and other resources. Subsequent to the browser being loaded, a user or automated browser process may cause the client computing device to transmit a request to access content from a content provider by establishing a browsing session with a network computing provider across a private or public network. In an illustrative embodiment, responsive to the request received from the client computing device, the network computing provider may assign, place, or otherwise connect the client computing device to a network computing component that can retrieve requested content on behalf of the client computing device. For example, the network computing provider can instantiate, on a server computing device, an instance of a virtual machine that includes a software browser application capable of requesting resources from a communication network.

The network computing component to which the client computing device is assigned may also have other client computing devices assigned to it. The network computing component can request content on behalf of some or all of the client computing devices assigned to it. When the network computing component receives a request from a client computing device for content from a content provider, the network computing component can open a network connection to the content provider, such as a Hypertext Transfer Protocol ("HTTP") connection, retrieve the requested content, and keep the network connection open. The newly opened network connection may be pooled with other network connections to the same content provider or different content providers. Subsequent requests for content from the content provider, whether from the same client computing device or another client computing device assigned to the network computing component, may be fulfilled by utilizing one of the previously opened network connections in the connection pool. In some embodiments, the network computing component may maintain a cache of previously retrieved content. The cache may be shared between the multiple client computing devices assigned to the network computing component in a manner similar to the sharing of network connections.

Illustratively, the network computing provider may include a management component that identifies a network computing component with which to connect the client computing device. The management component may inspect the request received from the client computing device in order to determine the content provider from which to retrieve the requested content. The management component may then determine which network computing component has an available open network connection to the content provider, or maintains a cache of content offered by the content provider. By assigning the client computing device to a network computing component which already has an open network connection to the content provider or cache of content offered by the content provider, content may be retrieved immediately or substantially immediately without the need to open a new network connection to the content provider, perform a handshake procedure, and the like. If the network computing component maintains a cache of content offered by the content provider, content requests may be fulfilled out of the cache without any further network traffic between the network computing component and the content provider.

The management component may retrieve or otherwise obtain a request profile associated with the client computing device or a user thereof. The request profile can indicate which content providers the client computing device typically requests content from. The management component may use this data when determining a network computing component with which to assign the client computing device, such as by selecting a network computing component that has available open connections with content providers from which the client computing device typically requests content. The management component or assigned network computing component may also use the request profile to proactively open network connections to those content providers from which the client computing device is likely to request content prior to receiving a request from the client computing device for content from the likely content providers.

In additional embodiments, the client computing device may be assigned to a network computing component which transfers or hands off requests for content to other network computing components which have available open connections to the content source hosting the requested content. Each request may be transmitted from the client device to a single gateway network computing component. That gateway network computing component may have available open network connections to one or more content providers, and may also be configured to identify other network computing components that have available open network connections to content providers with which the gateway network computing component does not have an available open network connection. In response to a request from a client computing device for content hosted by a content provider with which the gateway network computing component does not have an available open network connection, the gateway network computing component may hand off the request. For example, the request may be transferred to another network computing component which does have an available open network connection to the content provider in order to fulfill the request.

In further embodiments, the management component may monitor which network computing components have available open network connections to which content providers. The management component may also monitor which network computing components have client computing devices assigned to them. In addition, the management component may analyze performance metrics regarding response times associated with the content requests. The management component may use the monitoring data or performance metrics to determine a preferred or optimal number of active network computing components and overall makeup of available open network connections pooled on the network computing components. In some cases, the number of active network computing components may be reduced so as to increase utilization of available open network connections to content providers.

With reference to another illustrative example, a client computing device may initiate a computing session with a network computing provider to interact with a data set, such as the human genome data set. A second client computing device may subsequently initiate a computing session. The management component may determine, based on a network resource usage profile associated with the second client device or the user thereof, that the second client computing device will likely request or otherwise work with the same data set. Such a determination may be made in a manner similar to the determination described above regarding requests for content from the same content provider. The management component may assign the second computing device to the same network computing component as the first client computing device, thereby providing an opportunity for resource sharing and reducing or eliminating the need to retrieve duplicate data sets. In some embodiments, the management component may adjust the number available network computing components in order to increase the opportunities for sharing data sets, designate particular network computing components for specific data sets, etc.

With reference now to FIG. 1, an illustrative network computing environment in which connection sharing and pooling features may be implemented will be described. The illustrative network computing environment includes any number of client computing devices 104 (generally referred to as clients) for requesting content from any number of content servers 106. A network computing provider 100 may act as an intermediary between the clients 104 and content servers 106. The network computing provider 100 may include any number of network computing components 130 and a management component 120 for assigning clients 104 to network computing components 130, managing the number of available network computing components 130, and the like.

In an illustrative embodiment, the client computing devices 104 can correspond to a wide variety of computing devices including personal computing devices, laptop computing devices, hand-held computing devices, terminal computing devices, mobile devices (e.g., mobile phones, tablet computing devices, etc.), wireless devices, various electronic devices and appliances and the like. In an illustrative embodiment, the client computing devices 104 include necessary hardware and software components for establishing communications over a communication network 110, such as a wide area network or local area network. For example, the client computing devices 104 may be equipped with networking equipment and browser software applications that facilitate communications via the Internet or an intranet. The client computing devices 104 may have varied local computing resources such as central processing units and architectures, memory, mass storage, graphics processing units, communication network availability and bandwidth, etc.

Content providers 106 may communicate with the network computing provider 100, one or more client computing devices 104, or other service providers (e.g., a CDN service provider) via the communication network 110. The content providers 106 can correspond to a logical association of one or more computing devices associated with a content provider. Specifically, a content provider 106 can include a web server component corresponding to one or more server computing devices for obtaining and processing requests for content (such as web pages) from the client computing devices 104 or other service providers. The content provider 106 can further include an origin server component corresponding to one or more computing devices for obtaining and processing requests for network resources from a CDN service provider. The content provider 106 can still further include an application server computing device, such as a data streaming server, for processing streaming content requests. One skilled in the relevant art will appreciate that a content provider 106 can be associated with various additional computing resources, such as additional computing devices for administration of content and resources, DNS name servers, and the like.

With continued reference to FIG. 1, the network computing environment can further include a network computing provider 100 in communication with the one or more client computing devices 104 and content providers 106 via the communication network 110. The network computing provider 100 can also correspond to a logical association of one or more computing devices. Specifically, the network computing provider 100 can include a number of network computing components (NCCs) 130 for hosting applications, instances of a virtual machines, and the like. Each NCC 130 may include one or more devices, such as server computing devices and software, to provide computing resources to multiple client computing devices 104. An NCC 130 can retrieve a network resource, such as a web page, image, video file, applet, animation, document, or other content object of a web site, from a content source, such as a content provider 106. The NCC 130 may then return the network resource to the requesting client computing device 104. Optionally, the NCC 130 may perform one or more processing operations on the network resource prior to transmitting it to the client device. For example, the NCC may parse and render some or all of the network resource in a network browser or some other content rendering engine. Processing that occurs at the network browser can be mirrored at or transmitted to the browser of the client computing device 104. One example of a content rendering engine executing on a network computing component, and the browsing configurations and processing that facilitate usage of the content rendering engine, is described in U.S. patent application Ser. No. 13/174,589, the disclosure of which is hereby incorporated by reference.

The network computing provider 100 may also include a management component 120. The management component 120 may assign client computing devices 104 to individual or groups of NCCs, manage the number of active NCCs 130 and which network connections the NCCs 130 maintain, and the like. The management component 120 may correspond to one or more servers or other computing devices, physically or logically grouped to perform some or all of the functions described herein. The management component 120 illustrated in FIG. 1 includes a profile determination module 122, a load balancing module 124, and a request data store 126. Data regarding requests received from client computing devices 104 may be stored in the request data store 126. The profile determination module 122 can analyze request data and determine a request profile for a client computing device 104, a user of a client computing device 104, or some group or combination thereof. The request profile can indicate the typical content items requested by a client device 104 or user, the typical content providers 106 that host requested content items, and the like. The load balancing module 124 or some other module of the management component 120 can utilize the request profile when identifying an NCC 130 with which to associate a client computing device 104. In addition, the load balancing module 124 may utilize the request profiles, current performance metrics, and other monitoring data when determining which NCCs 130 are to remain active, which NCCs 130 to deactivate, or which connections should be maintained.

Each module and data store of the management component 120 may be implemented on the same computing device or different computing devices. For example, the profile determination module 122 may be implemented as a combination of a software module executing on a server computing device. The load balancing module 124 may also be implemented in a combination of software and hardware on the same computing device or a different computing device than the profile determination module 122.

The NCCs 130 and management component 120 can communicate with each other over a network 140. The network 140 may, for example, be a publicly accessible network of linked networks, possibly operated by various distinct parties, such as the Internet. In other embodiments, the network 140 may be a private network, such as, for example, a corporate or university network that is wholly or partially inaccessible to non-privileged users. In still other embodiments, the network 140 may include a private network, personal area network, local area network, wide area network, or combination thereof, each with access to and/or from the Internet.

In operation, a client computing device 104 transmits a request for a network resource, such as a web page, via a browser. As described herein, the request can be transmitted to the network computing provider 100 instead of directly to a content provider 106, and the client computing device 104 can be connected to or otherwise assigned to an NCC 130 by the management component 120 or some other component of the network computing provider 100. The NCC 130 can open a connection with the content provider 106, retrieve and process the requested web page, and transmit the requested page (or a modified version of it) to the client computing device 104. The NCC 130 can maintain the open connection with the content provider 106 for use in satisfying future requests, either from the same client computing device 104 or from a different client computing device 104. In some embodiments, the open connection may be maintained for a predetermined or dynamically determined period of time before the NCC 130 closes the connection or allows the connection to be closed.

The management component 120 may store information regarding the request in the request data store 126. The profile determination module 122 may analyze the request data in order to determine a request profile for the client computing device 104 or a user thereof. The request profile may be used in future browsing sessions to select an NCC 130 that has open connections to one or more content providers 106 from which the client computing device 104 is likely (or has a likelihood exceeding a threshold) to request content.

A second client computing device 104 may subsequently transmit a request for content from the same content provider 106. Alternatively, the second client computing device 104 may be associated with a request profile that indicates a likelihood of a request for content from the same content provider 106. The load balancing module 124 or some other module of the management component 120 may determine that the NCC 130 to which the first client computing device 104 was assigned has an open connection to the content provider 106. The load balancing module 124 may then connect or otherwise assign the second client computing device 104 to the same NCC 130 as the first client computing device 104 so that the open connection to the content provider 106 may be re-used. In some embodiments, the NCC 130 may open (or be instructed by the management component 120 to open) additional network connections to the content provider 106. Accordingly, as client computing devices 104 initiate browsing sessions, they may be assigned to the same NCC 130 if they request content from the same content provider 106 or are associated with a request profile indicating a likelihood exceeding a threshold of requesting content from the same content provider 106.

Figure 2:
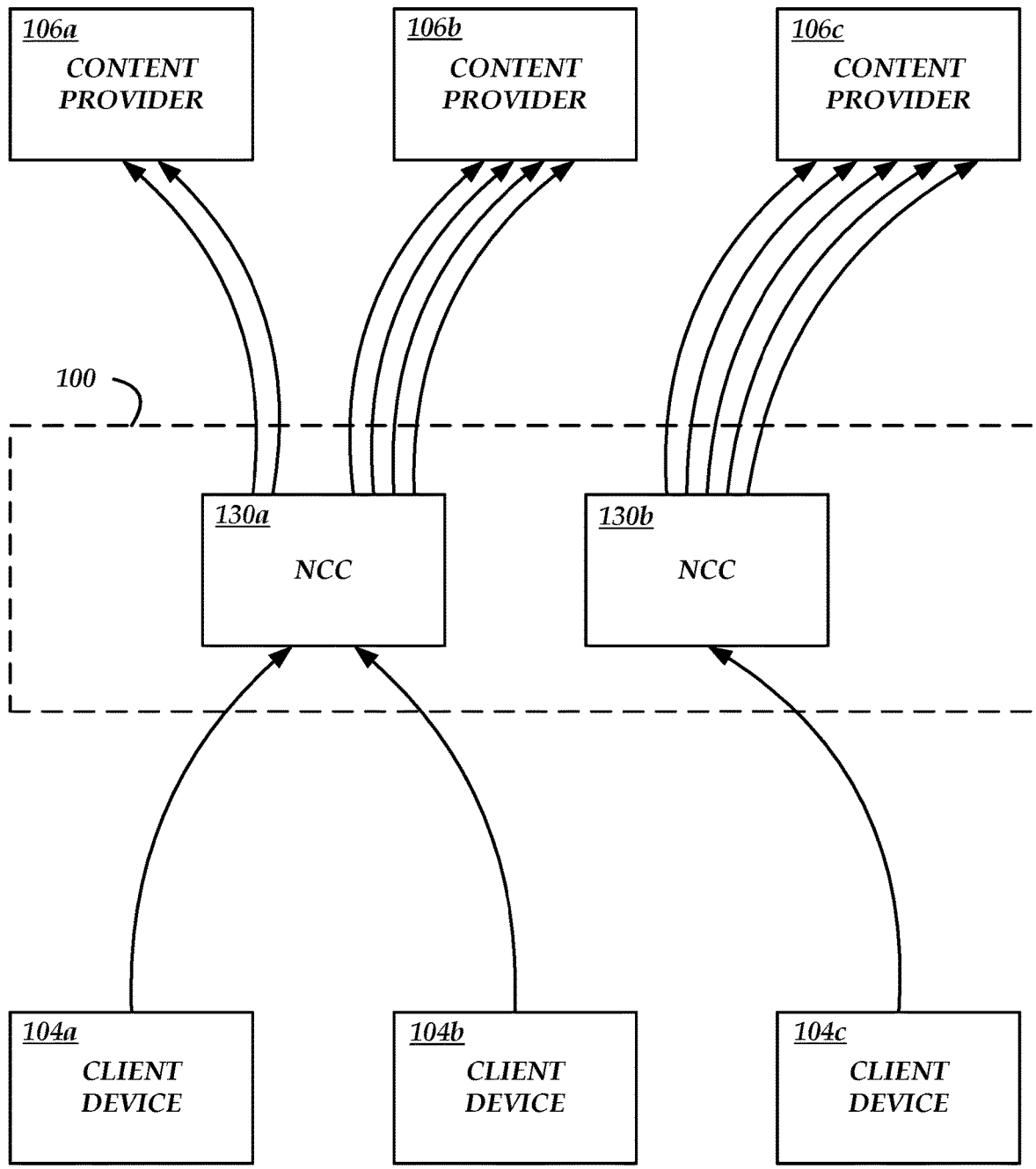
FIG. 2 is a block diagram illustrating the establishment of network connections between client computing devices, network computing components, and content servers.
Figure 3:
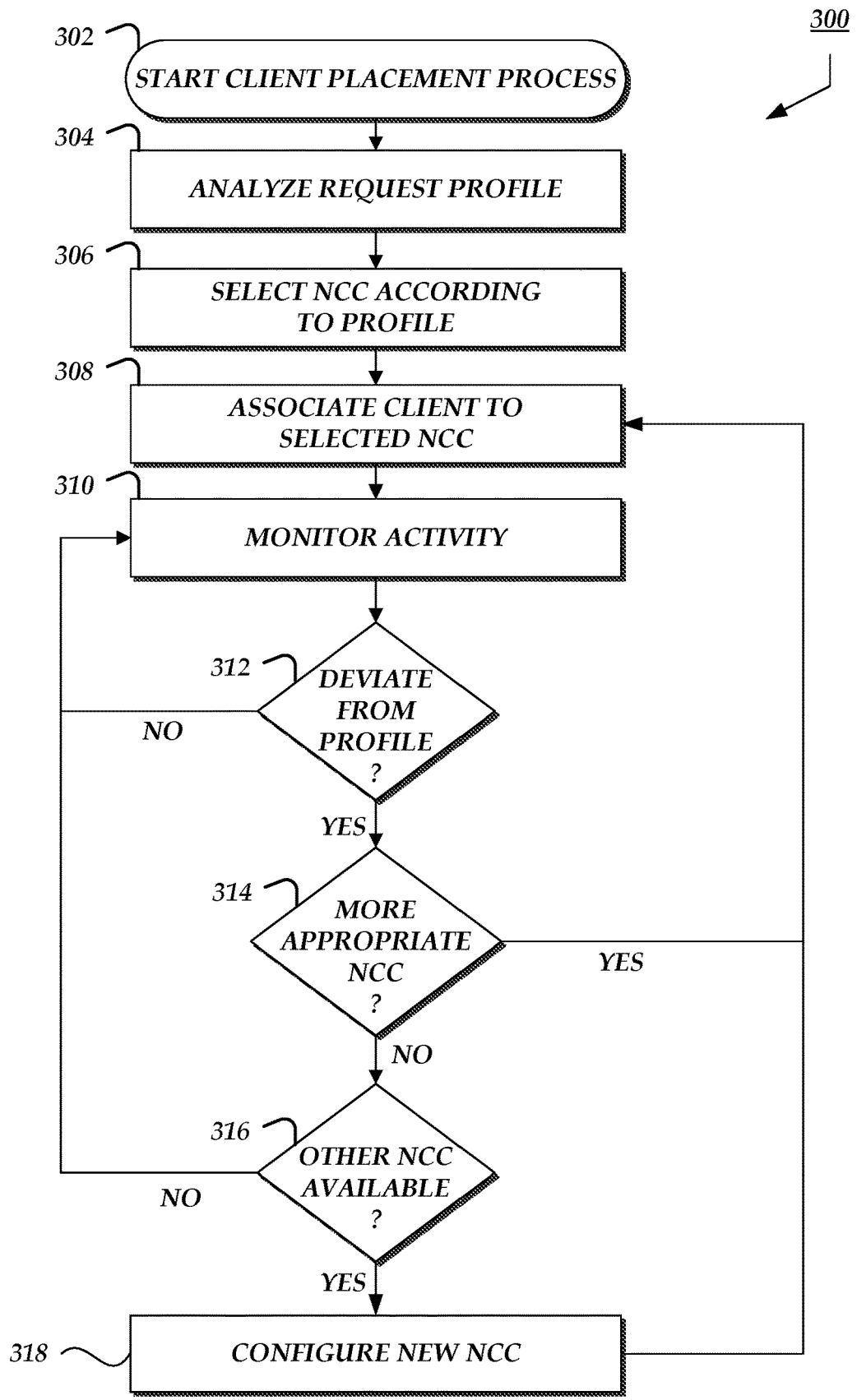
FIG. 3 is a flow diagram of an illustrative process for establishing and managing network connections between client computing devices, network computing components, and content servers.

FIG. 2 illustrates network connections between multiple client computing devices 104, NCCs 130, and content providers 106. The network computing provider 100 shown in FIG. 2 has two NCCs 130a, 130b. NCC 130a has available open network connections to two different content providers 106a, 106b, while NCC 130b has available open network connections to a third content provider 106c. Client devices 104a, 104b, 104c can connect to the network computing provider 100 and request content from the content providers 106a, 106b, 106c shown in FIG. 2 and other content providers 106 not shown. FIG. 3 illustrates a flow diagram of a process 300 for assigning the client devices 104a, 104b, 104c to individual NCCs 130a, 130b based on request profiles. Advantageously, the process 300 can be used to identify an NCC with available open network connections to the content providers from which a client device is likely (or associated with a likelihood exceeding a threshold) to request content.

The process 300 for selecting an NCC 130 to fulfill requests from a client computing device 104 based on a request profile begins at block 302. The process 300 may be executed by the management component 120 or some other component of the network computing provider 100. In some embodiments, the process 300 may be embodied in a set of executable program instructions and stored on a computer-readable medium drive associated with a computing system. When the process 300 is initiated, the executable program instructions can be loaded into memory, such as RAM, and executed by one or more processors of the computing system. In some embodiments, the computing system may include multiple processors, and the process 300 may be executed by two or more processors, serially or in parallel.

The process 300 may be executed in response to a request from a client computing device 104a. The client computing device 104a may initialize a browsing session with the network computing provider 100, and the management component 120 may assign the client computing device 104a to an NCC 130a based on a first content request or in the absence of a content request.

At block 304, the management component 120 may obtain the request profile associated with the client computing device 104a. The request profile can be analyzed to determine from which content providers 106 the client computing device 104a is likely to request content. With reference to FIG. 2, the load balancing module 124 may determine that client computing device 104a is most likely to request content from content providers 106a and 106b.

At block 306, the management component 120 can select an NCC with which to assign the client computing device 104a based on the request profile and any available open network connections that the NCCs may have. For example, the management component 120 may determine that the NCC 130a has available open network connections to both content provider 106a and content provider 106b, which are the two content providers from which the request profile indicated the client computing device 104a is likely to request content. A separate NCC 130b has no available open network connections to either content provider 106a or 106b. In this example, the management component 120 may select NCC 130a. If instead the request profile indicated that the client computing device 104a were more likely to request content from a different content provider, such as content provider 106c, the management component 120 may select a different NCC, such as NCC 130b.

At block 308, the management component 120 may assign the client computing device 104a to the NCC 130a selected in block 306. Assigning or associating the client computing device 104a to the NCC 130a can include causing a network connection to be established between the NCC 130a and the client computing device 104a, or causing an existing network connection between the client computing device 104a and some component of the network computing provider 100 to be transferred to the selected NCC 130a.

At block 310, the management component 120 or the NCC 130a may monitor the activity of the client computing device 104a. Activity such as content requests, connections utilized, performance metrics related to requests for content and fulfillment of those requests, and the like may be monitored.

At decision block 312, the management component 120 can determine whether the requests submitted by the client computing device 104a during the present browsing session have deviated from the request profile for the client computing device 104a, or whether the currently assigned NCC 130a is otherwise not optimally configured to fulfill requests from the client computing device 104a. For example, the client computing device 104a may not request any content from content providers 106a or 106b, but may instead request content from content provider 106c. In such a case, the management component 120 may determine that the requests have deviated from the request profile, and the process 300 may proceed to decision block 314. Otherwise, the process may return to block 310, where the management component 120 resumes or continues monitoring. In some embodiments, the performance of the assigned NCC 130a may be unacceptable even though the client computing device 104a has not deviated from the request profile. In such cases, the process 300 may also proceed to decision block 314.

At decision block 314, the management component 120 can determine whether there is a different NCC that may better fulfill the requests from the client computing device 104a. Returning to the example above, the management component 120 may have determined that client computing device 104a has deviated from the request profile, or is otherwise requesting content from content providers 106 to which the currently NCC 130a may not have available open network connections. The load balancing module 124 may identify a different NCC 130b that does have available open network connections to the content provider 106c from which the client computing device 104a is requesting content. If a different NCC 130b is identified, the process 300 may return to block 308, where the client computing device 104a is associated with the identified NCC 130b. In some cases, such a reassignment may be performed the first time that the client computing device 104a requests content from a content provider with which the originally assigned NCC 130a does not have an available open network connection. Otherwise, the NCC 130a may open a connection with the other content provider 106c and keep the connection open for reuse in fulfilling later requests.

If an NCC that is more appropriate is not identified, the process 300 may proceed to decision block 316. At decision block 316, the management component 120 may determine whether a different NCC 130 is available to be configured for fulfilling requests from the client computing device 104a. For example, the number of active NCCs may be increased, and a new NCC 130 (not pictured) may be configured to fulfill requests from the client computing device 104a at block 318. If no additional NCC 130 is available to activate or reconfigure, the process 300 may return to block 310, where request activity from the client computing device 104a is monitored and the operations of decision blocks 312, 314, and 316 may be repeated in response to additional requests as necessary until an appropriate NCC 130 is identified.

Figure 4:
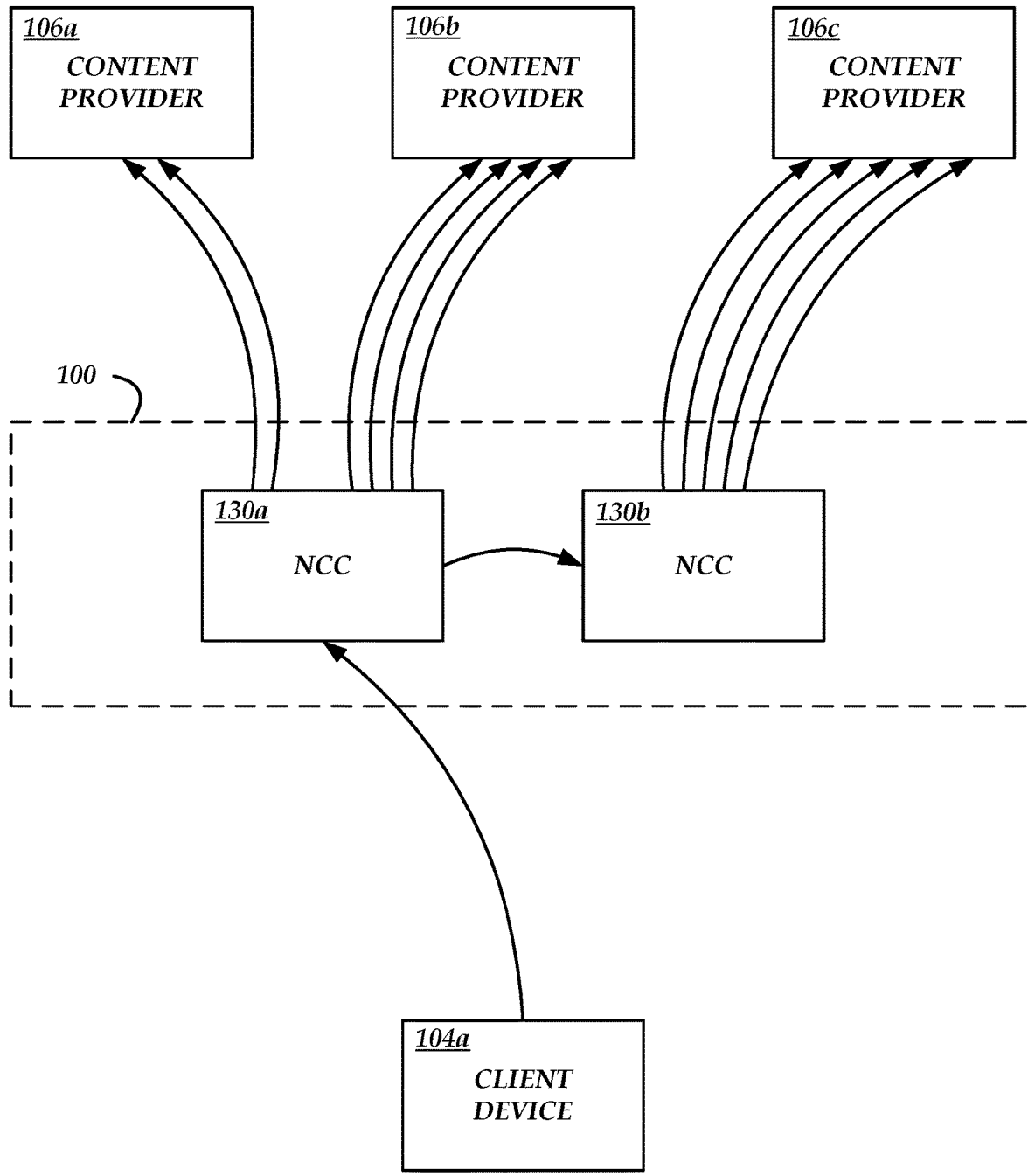
FIG. 4 is a block diagram illustrating the handoff of request processing between network computing components.

FIG. 4 shows illustrative network connections between a single client computing device 104a, multiple network computing components 130a, 130b, and multiple content providers 106a, 106b, 106c. The client device 104a may be assigned to a single NCC 130a, for example through the process 300 described above with respect to FIG. 3. Rather than reassigning the client computing device 104a to a different NCC 130b if the original NCC 130a is not optimally configured to fulfill the requests, the original NCC 130a may serve as a gateway to other NCCs, such as NCC 130b, which may have available open network connections to other content providers, such as content provider 106c.

Figure 5:
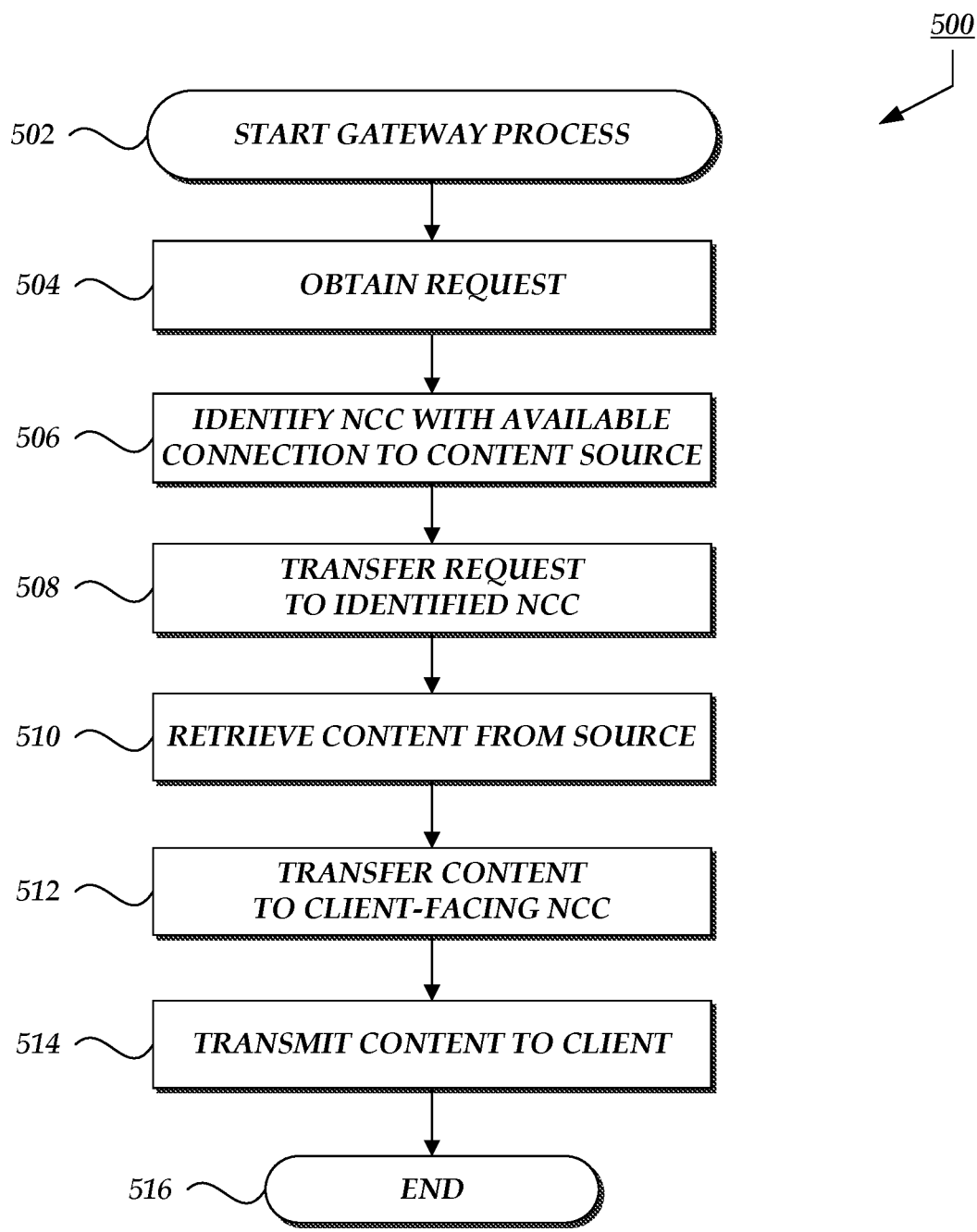
FIG. 5 is a flow diagram of an illustrative process for managing the handoff of request processing between network computing components.

The process 500 shown in FIG. 5 may be used to assign a client computing device 104a to a gateway NCC 130b. The management component 120 may select an NCC 130 based on a request profile, a first request from a client computing device 104, or some other criteria. In some embodiments, one or more NCCs 130 may serve only as gateways to NCCs 130 pre-configured with available open network connections, and client computing devices 104 are assigned to a gateway NCC in response to browsing session initialization. A gateway NCC 130*a* may be configured with software and hardware to identify other NCCs that have available open network connections to content providers 106 hosting content requested by the client computing device 104. The gateway NCC 130*a* may then transfer the content request to the selected NCC 130*b* or otherwise employ the other NCC 130*b* to retrieve the requested content on behalf of the client computing device 104.

The process 500 used by a gateway NCC 130 for fulfilling content requests begins at block 502. The process 500 may be executed by the gateway NCC 130 or some other component of the network computing provider 100, such as the management component 120. In some embodiments, the process 500 may be embodied in a set of executable program instructions and stored on a computer-readable medium drive associated with a computing system. When the process 500 is initiated, the executable program instructions can be loaded into memory, such as RAM, and executed by one or more processors of the computing system. In some embodiments, the computing system may include multiple processors, and the process 500 may be executed by two or more processors, serially or in parallel.

At block 504, gateway NCC 130*a* illustrated in FIG. 4 may obtain a content request from a client computing device 104*a*. The request may be a request for content from a content provider 106*c* with which the gateway NCC 130*a* does not have an available open network connection. At block 506, the gateway NCC 130*a* can identify an NCC with an available open connection to the content provider 106*c* from which the client computing device 104*a* has requested content. The gateway NCC 130*a* may have access to a listing of which connections are currently maintained by each of the available NCCs. In some embodiments, the gateway NCC 130*a* may contact a service of the management component 120 that responds to requests for information about available NCCs and the connections that they maintain. In the example illustrated in FIG. 4, the gateway NCC 130*a* may identify NCC 130*b*.

At block 508, the gateway NCC 130*a* can transfer the request to the identified NCC 130*b*. Transferring the request may involve passing the original request (e.g.: HTTP GET request) received from the client computing device 104*a* to the identified NCC 130*b*, notifying the NCC 130*b* to retrieve the requested content from the content provider 106*c* identified in the request, etc. At block 510, the NCC 130*b* can utilize an available open network connection with the content provider 106*c* to retrieve the requested content item on behalf of the client computing device 104*a*. At block 512, the NCC 130*b* may transfer the retrieved content to the gateway NCC 130*b* for transmission to the client computing device 104*a* at block 514. In some embodiments, the NCC 130*b* which retrieved the content may transmit the content directly to the client computing device 104*a*.

Figure 6:
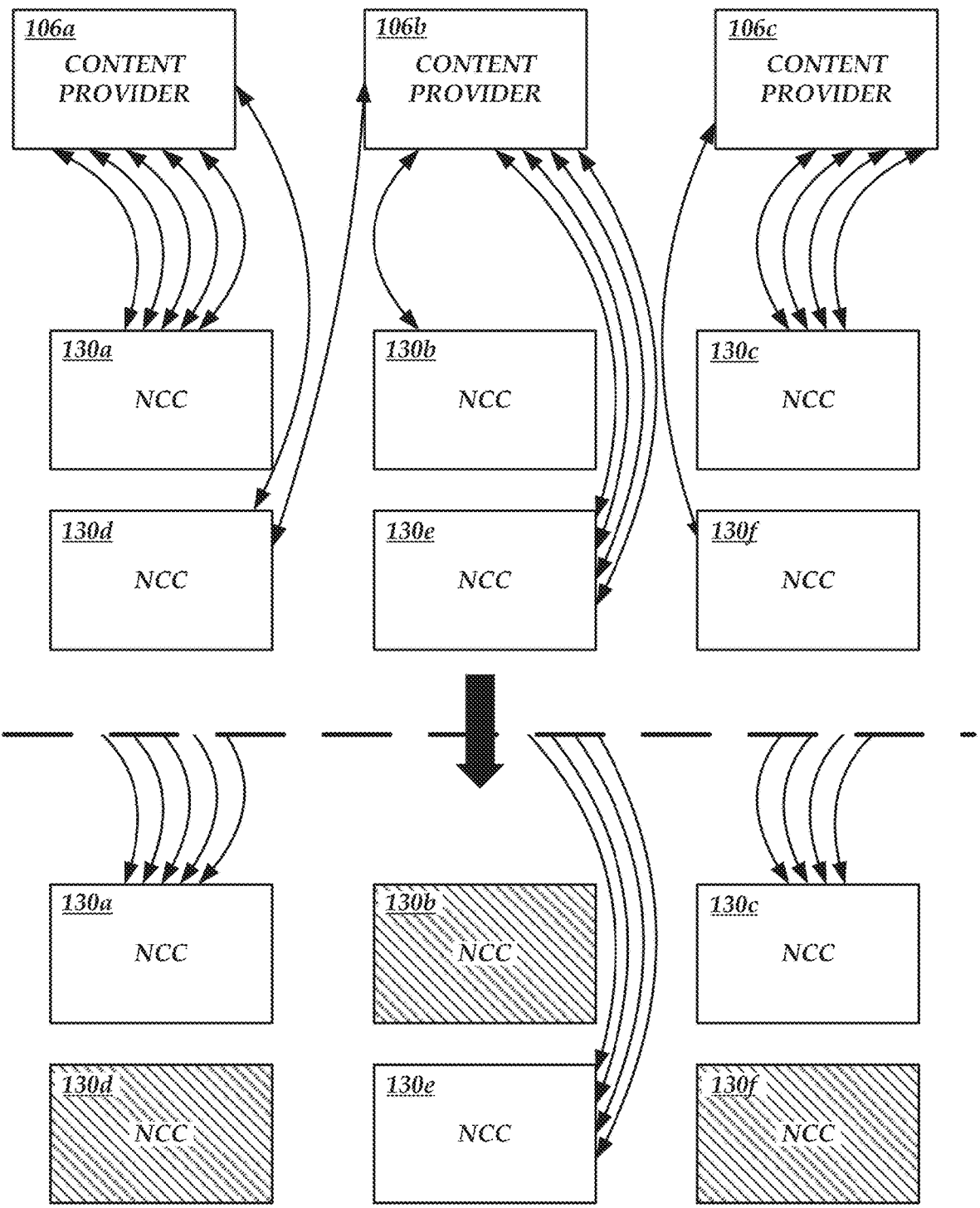
FIG. 6 is a block diagram illustrating a reduction in the number of active network computing components.

FIG. 6 illustrates multiple network computing components 130*a*-130*f* with varying number of network connections to content providers 106*a*-106*c*. NCC has multiple network connections to content provider 106*a*; NCC 130*b* has a single network connection to content provider 106*b*; NCC 130*c* has multiple network connections to content provider 106*c*; NCC 130*d* has a single network connection to content provider 106*a* and 106*b*, respectively; NCC 130*e* has multiple network connections to content provider 106*b*; and NCC 130*f* has a single network connection to content provider 106*c*.

NCCs 130 which are no longer assigned to client computing devices 104 may be deactivated. Rather than providing additional computing capacity for client computing devices 104, the excess NCCs 130 may instead spread out the assignment of client computing devices 104 and reduce the number of opportunities for connection sharing and reuse. For example, two or more client computing devices 104 which are requesting content from the same content, providers 106 may be assigned to different NCCs 130, and therefore may not be able to take advantage of connection sharing and reuse between them. Accordingly, the number of active NCCs may be reduced in order to increase the average number of client computing devices 104 assigned to each NCC 130 and, as a result, increase the opportunity for connection sharing.

The load balancing module 124, some other module of the management component 120, or some other component of the network computing provider 100 may track the active NCCs 130*a*-130*f*, and the network connections maintained by each NCC. The load balancing module 124 may determine whether an adjustment in the number of active NCCs or the network connections maintained by the NCCs may increase the number of opportunities for connection sharing and reuse among client computing devices 104 assigned to the NCCs. For example, if a single client computing device 104 is assigned to NCC 130*d* and is utilizing a network connection to content provider 106*b* and a connection to content provider 106*a*, that client computing device 104 may be more effectively assigned to NCC 130*e*. NCC 130*e* has multiple available open network connections to content provider 106*b*, and may have multiple client computing devices 104 assigned to it. A new connection to content provider 106*a* may be established from NCC 130*e*. Accordingly, the transferred client computing device 102 may utilize the existing pool of connections to content provider 106*b*, and the client computing devices already assigned to the NCC 130*e* may utilize the newly created connection to content provider 106*a*.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
   computer-readable memory storing executable instructions; and
   one or more processors in communication with the computer-readable memory and configured by the executable instructions to at least:
      obtain data regarding operation of a first network computing component of a pool of available network computing components, wherein the first network computing component has one or more first currently-open network connections to a content provider;
      obtain data regarding operation of a second network computing component of the pool of available network computing components, wherein the second network computing component has one or more second currently-open network connections to the content provider;
      determine that the first network computing component has the one or more first currently-open network connections to the content provider, wherein the first network computing component is configured to use the one or more first currently-open network connections to obtain content from the content provider on behalf of a requesting device;
      determine to exclude the second network computing component from the pool of available network computing components based on the first network component having the one or more first currently-open network connections to the content provider to obtain content from the content provider on behalf of the requesting device; and
      exclude the second network computing component from the pool of available network computing components.

2. The system of claim 1, wherein one or more processors are further configured to:
   analyze the data regarding operation of the first network computing component and the data regarding the second network computing component; and
   determine that reducing a size of the pool of available network computing components will increase opportunities for sharing network connections.

3. The system of claim 1, wherein the executable instructions to exclude the second network computing component from the pool of available network computing components comprise executable instructions to reassign a first client computing device, associated with the second network computing component, from the second network computing component to the first network computing component.

4. The system of claim 3, wherein subsequent to reassigning the first client computing device to the first network computing component, a second client computing device previously assigned to the first network computing component shares a network connection to the content provider with the first client computing device.

5. The system of claim 1, wherein the executable instructions to exclude the second network computing component from the pool of available network computing components comprise executable instructions to tag the second network computing component as unavailable.

6. The system of claim 1, wherein the first network computing component is operable to establish a network connection to a second content provider in response to an assignment of a first client computing device to the first network computing component, wherein the second network computing component previously established a network connection to the second content provider in response to a request from the first client computing device.

7. The system of claim 1, wherein the first network computing component comprises a server-side browser in communication with a client-side browser of a client computing device, and wherein the first network computing component is operable to:

process, in the server-side browser, requested network content and at least one embedded resource associated with the network content to generate a processing result; and transmit the processing result to the client computing device.

8. The system of claim 1, wherein one or more processors are further configured to:

analyze the data regarding operation of the first network computing component and the data regarding the second network computing component; and determine that reducing a size of the pool of available network computing components will increase opportunities for sharing cached resources.

9. The system of claim 1, wherein the one or more processors are further configured to:

receive, from a client computing device, a request for network content provided by the content provider;

select the first network computing component based at least partly on a content request profile associated with the client computing device, wherein the content request profile indicates one or more content providers from which the client computing device is likely to request retrieval of content; and cause the first network computing component to establish a computing session with the client computing device.

10. The system of claim 9, wherein the one or more processors are further configured to cause a third network computing component to establish a second computing session with the client computing device based at least partly on an analysis of the content request profile and one or more requests from the client computing device during the computing session.

11. A computer-implemented method comprising:

as performed by a computing system comprising one or more processors configured to execute specific instructions, obtaining data regarding operation of a first network computing component of a pool of available network computing components, wherein the first network computing component has one or more first currently-open network connections to a content provider;

obtaining data regarding operation of a second network computing component of the pool of available network computing components, wherein the second network computing component has one or more second currently-open network connections to the content provider;

determining that the first network computing component has the one or more first currently-open network connections to the content provider, wherein the first network computing component is configured to use the one or more first currently-open network connections to obtain content from the content provider on behalf of a requesting device;

determining to exclude the second network computing component from the pool of available network computing components based on the first network component having the one or more first currently-open network connections to the content provider to obtain content from the content provider on behalf of the requesting device; and excluding the second network computing component from the pool of available network computing components.

12. The computer-implemented method of claim 11, further comprising:

analyzing the data regarding operation of the first network computing component and the data regarding the second network computing component; and determining that reducing a size of the pool of available network computing components will increase opportunities for sharing network connections among client computing devices.

13. The computer-implemented method of claim 11, wherein excluding the second network computing component from the pool of available network computing components comprises reassigning a first client computing device, associated with the second network computing component, from the second network computing component to the first network computing component.

14. The computer-implemented method of claim 13, further comprising causing a second client computing device previously assigned to the first network computing component to share a network connection to the content provider with the first client computing device.

15. The computer-implemented method of claim 11, wherein excluding the second network computing component from the pool of available network computing components comprises tagging the second network computing component as unavailable.

16. The computer-implemented method of claim 11, further comprising establishing, by the first network computing component, a network connection to a second content provider in response to an assignment of a client computing device to the first network computing component, wherein the second network computing component previously established a network connection to the second content provider in response to a request from the client computing device.

17. The computer-implemented method of claim 11, further comprising:

processing, in a server-side browser executing on the first network computing component, requested network content and at least one embedded resource associated with the requested network content to generate a processing result; and transmitting the processing result to the client computing device.

18. The computer-implemented method of claim 11, further comprising:

analyzing the data regarding operation of the first network computing component and the data regarding the second network computing component; and determining that reducing a size of the pool of available network computing components will increase opportunities for sharing cached resources.

19. The computer-implemented method of claim 11, further comprising:

receiving, from a client computing device, a request for network content provided by the content provider;

selecting the first network computing component based at least partly on a content request profile associated with the client computing device, wherein the content request profile indicates one or more content providers from which the client computing device is likely to request retrieval of content; and causing the first network computing component to establish a computing session with the client computing device.

20. The computer-implemented method of claim 19, further comprising causing a third network computing component to establish a second computing session with the client computing device based at least partly on an analysis of the content request profile and one or more requests from the client computing device during the computing session.

\* \* \* \* \*